United States Patent
Rimboim et al.

(10) Patent No.: US 7,117,272 B2
(45) Date of Patent: Oct. 3, 2006

(54) INTERCHANGEABLE POWER OVER ETHERNET MODULE

(75) Inventors: Poldi Rimboim, Ashdod (IL); Yaniv Giat, Modiin (IL); Dror Korcharz, Bat Yam (IL)

(73) Assignee: Powerdsine Ltd., Hod Hasharon (IL)

( * ) Notice: Subject to any disclaimer, the term of this patent is extended or adjusted under 35 U.S.C. 154(b) by 44 days.

(21) Appl. No.: 11/056,137

(22) Filed: Feb. 14, 2005

(65) Prior Publication Data

US 2005/0246562 A1   Nov. 3, 2005

Related U.S. Application Data

(60) Provisional application No. 60/562,994, filed on Apr. 19, 2004.

(51) Int. Cl.
*G06F 13/00* (2006.01)
(52) U.S. Cl. .................... 709/250; 710/64; 710/305
(58) Field of Classification Search .............. 709/224, 709/238, 250; 710/64, 305
See application file for complete search history.

(56) References Cited

U.S. PATENT DOCUMENTS

| | | | |
|---|---|---|---|
| 4,916,642 A | 4/1990 | Kaiser et al. | |
| 6,229,432 B1 | 5/2001 | Fridley et al. | |
| 6,473,608 B1 | 10/2002 | Lehr et al. | |
| 6,603,218 B1 | 8/2003 | Aisa | |
| 6,643,566 B1 | 11/2003 | Lehr et al. | |
| 6,729,913 B1* | 5/2004 | Bruski et al. | 439/676 |
| 6,934,788 B1* | 8/2005 | Laity et al. | 710/303 |
| 6,947,287 B1* | 9/2005 | Zansky et al. | 361/731 |
| 2003/0061522 A1* | 3/2003 | Ke et al. | 713/300 |
| 2004/0180573 A1* | 9/2004 | Chen | 439/502 |

FOREIGN PATENT DOCUMENTS

WO   PCT/IL2005/000200   6/2005

OTHER PUBLICATIONS

IEEE 802.3af-2003 Standard—Jun. 18, 2003, IEEE, N.Y.

* cited by examiner

*Primary Examiner*—Viet D. Vu

(57) ABSTRACT

An interchangeable power over Ethernet module having a plurality of configurations, and a single unified pin out, the power over Ethernet module comprising: at least one circuitry managing the supply of power over Ethernet to at least one port; a first set of connections associated with a first one of the plurality of configurations, the first one of the plurality of configuration comprising supervisory control circuitry, the first set of connections being operably connected to the supervisory control circuitry; the first set of connections being connected together in a second one of the plurality of configurations.

20 Claims, 7 Drawing Sheets

INTERCHANGEABLE POWER OVER ETHERNET MODULE

CROSS-REFERENCE TO RELATED APPLICATIONS

This application claims priority from U.S. Provisional Patent Application Ser. No. 60/562,994 filed Apr. 19, 2004 entitled "Interchangeable Power Over Ethernet Module" the contents of which are incorporated herein by reference.

BACKGROUND OF THE INVENTION

The present invention relates to the field of power over Ethernet, and more particularly to an interchangeable power over Ethernet module having a plurality of configurations and a single unified pin out.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including: U.S. Pat. No. 6,473,608 issued to Lehr et al., whose contents are incorporated herein by reference and U.S. Pat. No. 6,643,566 issued to Lehr et al., whose contents are incorporated herein by reference. Furthermore a standard addressed to the issue of powering remote devices over an Ethernet based network has been published as IEEE 802.3af-2003, whose contents are incorporated herein by reference.

The implementation of an integrated switch supplying power over Ethernet functionality into a switch is advantageously accomplished by the use of a plugable module. Such a plugable module allows for implementing power over Ethernet functionality into a switch as required, and further allows for upgrades over time. Plugable modules are typically supplied in any of a number of industry standard pin layouts, so as to be compatible with low cost high volume sockets. Examples of such standard pin layouts are the Dual in-line Memory Module (DIMM) and the Single in-line Memory Module (SIMM) as specified by the JEDEC Solid State Technology Association of Arlington, Va.

An Ethernet switch is typically designed to support a plurality of ports, and power over Ethernet functionality may be supplied for some or all of the supported plurality of ports. For example, in a 48 port Ethernet switch or hub, only 12 or alternatively 24 of the ports may be initially provided with Power over Ethernet functionality. A separate module is then later added to provide Power over Ethernet functionality to additional ports.

In such a configuration, the initially provided module must supply 100% of the required functionality for the initial ports for which Power over Ethernet functionality is being supported, including any required supervisory control circuitry. The later added module may be provided without supervisory control circuitry, receiving its instructions from the supervisory control circuitry of the initially provided module. Preferably, different module types are available, with an enhanced module having added functionality not available in the basic module.

The term supervisory control circuitry, is meant to include any circuitry which provides supervisory control functionality for a plurality of power over Ethernet managing circuits. Such supervisory control circuitry may be included as part of one or more power over Ethernet managing circuits, or as a separate controller or microcontroller.

Field installation of such modules is preferably designed to be location independent, and to be interchangeable, such that a user can change between using basic modules and enhanced modules by simply unplugging the undesired modules and plugging in the desired modules. Furthermore, preferably the modules are interchangeable as to location, such that the location of the initially provided module and the later added module is not critical. This allows for field swapping of the modules and fewer errors caused by improper installation.

What is needed therefore, and is not provided by the prior art, is an interchangeable power over Ethernet module having a plurality of configurations.

SUMMARY OF THE INVENTION

Accordingly, it is a principal object of the present invention to overcome the disadvantages of prior art. This is provided in the present invention by an interchangeable power over Ethernet module having a plurality of configurations, and a single unified pin out. In an exemplary embodiment the plurality of configurations include: an enhanced master module having dedicated on-board supervisory control circuitry; a slave module designed to work with an enhanced master module; and a reduced functionality module having no dedicated on-board supervisory control circuitry. Preferably, each of the module configurations is supplied supporting either a first number of ports or a second number of ports.

This is provided in the present invention by an interchangeable power over Ethernet module having a plurality of configurations, and a single unified pin out, the power over Ethernet module comprising: at least one circuitry managing the supply of power over Ethernet to at least one port; a first set of connections associated with a first one of the plurality of configurations, the first one of the plurality of configuration comprising supervisory control circuitry, the first set of connections being operably connected to the supervisory control circuitry; the first set of connections being connected together in a second one of the plurality of configurations.

In an exemplary embodiment the interchangeable power over Ethernet module further comprises a second set of connections, each connection of the second set of connections being associated with a unique one of the at least one circuitry managing the supply of power over Ethernet to at least one port. In a further embodiment the power over Ethernet module comprises at least one connection being designated for connection to all of the at least one circuitry managing the supply of power over Ethernet in the second one of the plurality of configurations. In a yet further embodiment of the power over Ethernet module, the at least one connection not being operatively connected to the at least one circuitry managing the supply of power over Ethernet in the first one of the plurality of configurations.

In one embodiment the interchangeable power over Ethernet module further comprises a third configuration, the third configuration being a power over Ethernet module designed to be operated with a power over Ethernet module of the first configuration under control of the supervisory control circuitry.

In another embodiment the interchangeable power over Ethernet module further comprises a host communication bus for communicating with a host controller. In one further embodiment the host communication bus comprises a UART channel, and in another further embodiment the host communication bus comprises an I²C bus. In yet another further embodiment the interchangeable power over Ethernet module further comprises an inter-managing circuit communication path being operable by the supervisory control circuitry to communicate with the at least one circuitry managing the supply of power over Ethernet. In a yet further embodiment the control circuitry communicates with the host controller over the host communication bus and the supervisory control circuitry further communicates with the at least one circuitry managing the supply of power over Ethernet over the inter-managing circuit communication path.

In another embodiment the interchangeable power over Ethernet module further comprises an inter-managing circuit communication path, the inter-managing circuit communication path being operable by the supervisory control circuitry to communicate with the at least one circuitry managing the supply of power over Ethernet.

In yet another embodiment the second configuration is a power over Ethernet module without supervisory control circuitry. In a further embodiment the interchangeable power over Ethernet module according further comprises an inter-managing circuit communication path being connected to all of the at least one circuitry managing the supply of power over Ethernet. In another further embodiment the interchangeable power over Ethernet module further comprises a host communication bus for communication with a host controller. In a yet further embodiment the host communication bus is connected to all of the at least one circuitry managing the supply of power over Ethernet.

In another further embodiment the at least one circuitry managing the supply of power over Ethernet acts as a master. In an even further embodiment the interchangeable power over Ethernet module further comprises at least one connection being designated for connection to all of the at least one circuitry managing the supply of power over Ethernet in the second one of the plurality of configurations, the one of the at least one circuitry managing the supply of power over Ethernet acting as a master utilizing the at least one connection to address all other at least one circuitry managing the supply of power over Ethernet. In one even further embodiment the interchangeable power over Ethernet module further comprises a second set of connections, each connection being associated with a unique one of the at least one circuitry managing the supply of power over Ethernet, the at least one circuitry managing the supply of power over Ethernet acting as a master utilizing the second set of connections to address all other at least one circuitry managing the supply of power over Ethernet.

In another embodiment the interchangeable power over Ethernet module further comprises a reset request input connection and a reset output connection, the reset request input connection and the reset output connection being operably interconnected in the second configuration.

In yet another embodiment the interchangeable power over Ethernet module further comprises a disable port request input connection and a disable port output connection, the disable port request input connection and the disable port output connection being operably interconnected in the second configuration Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1A:
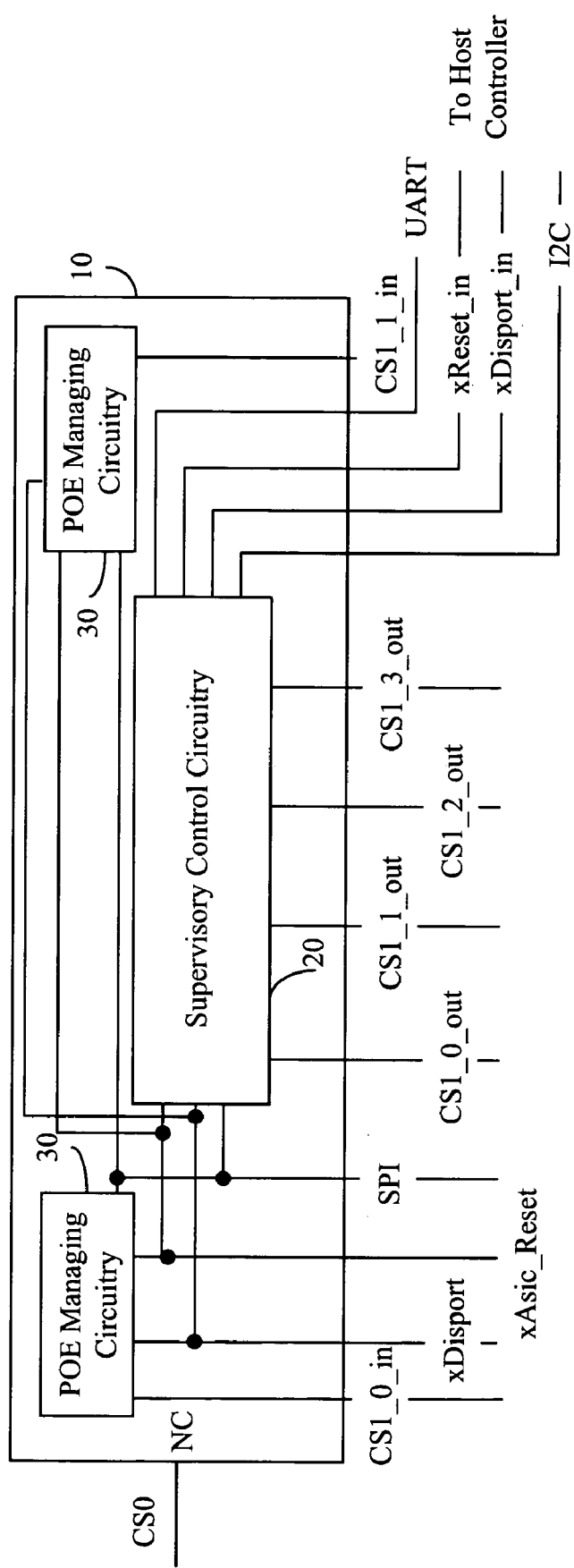
FIG. 1a is a high level schematic diagram of an enhanced power over Ethernet module serving 24 ports comprising supervisory control circuitry.

The present embodiments enable an interchangeable power over Ethernet module having a plurality of configurations and a single unified pin out. In an exemplary embodiment the plurality of configurations include: an enhanced master module having dedicated on-board supervisory control circuitry; a slave module designed to work with an enhanced master module; and a reduced functionality module having no on-board supervisory control circuitry. Preferably, each of the module configurations is supplied supporting either a first number of ports or a second number of ports. In an exemplary embodiment the first number of ports is 12 and the second number of ports is 24.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1a is a high level schematic diagram of an enhanced power over Ethernet module 10 serving 24 ports comprising supervisory control circuitry 20 and first and second power over Ethernet managing circuits 30. In the exemplary embodiment shown, two power over Ethernet managing circuits 30 are illustrated however this is not meant to be limiting in any way. Any number of power over Ethernet managing circuits 30 may be implemented without exceeding the scope of the invention. Similarly, in the exemplary embodiment, enhanced power over Ethernet module 10 serves 24 ports, however this is not meant to be limiting in any way. Any number of ports may be served without exceeding the scope of the invention. Power over Ethernet managing circuits 30 are illustrated as an application specific integrated circuit (ASIC), however this is not meant to be limiting in any way. Discrete circuitry, or a generic integrated circuit may be utilized without exceeding the scope of the invention.

The term supervisory control circuitry as used throughout this document is meant to include any circuitry which provides control functionality for a plurality of power over Ethernet managing circuits. Such supervisory control circuitry may be included as part of one or more power over Ethernet managing circuits, or as a separate controller or microcontroller. Furthermore, such supervisory control circuitry may be used to perform other functions, in addition to its supervisory control functionality, without exceeding the scope of the invention.

The term power over Ethernet managing circuit, sometimes known as a power over Ethernet controller or a power over Ethernet manager, is meant to include any circuitry performing power sourcing equipment functionality. Power sourcing equipment functionality preferably provides detection, optional classification and power delivery to a powered device capable of receiving power over Ethernet twisted pair cable, and is preferably in accordance with a power over Ethernet standard, such as the above mentioned IEEE 802.3af standard.

First power over Ethernet managing circuit 30 has a managing circuit select input connected to an external connection of power over Ethernet module 10, labeled CS1_0_in. Second power over Ethernet managing circuit 30 has a managing circuit select input connected to an external connection of power over Ethernet module 10, labeled CS1_1_in. An external connection labeled CS0 is supplied, however external connection CS0 is preferably not operative on either first or second power over Ethernet managing circuit 30.

Supervisory control circuitry 20 exhibits a plurality of managing circuit select outputs, also known as chip select outputs, connected to an external connection of power over Ethernet module 10, hereinafter labeled CS1_0_out; CS1_1_out; CS1_2_out; and CS1_3_out. Thus, as will be explained further hereinto below, for each power over Ethernet managing circuit which is to be controlled by supervisory control circuitry 20, a dedicated managing circuit select output appears as an external connection of power over Ethernet module 10.

Supervisory control circuitry 20 preferably exhibits an interrupt request input connected to an external connection of power over Ethernet module 10, labeled xReset_in. xReset_in is preferably connected to a host system controller (not shown) and is utilized by the host system controller to reset the plurality of power over Ethernet managing circuits 30. It is to be noted that in the preferred embodiment shown, the host system controller does not directly access first and second power over Ethernet managing circuits 30, but rather addresses a reset request to supervisory control circuitry 20. Supervisory control circuitry 20 preferably exhibits an output connected both to first and second power over Ethernet managing circuits 30 and to an external connection of power over Ethernet module 10, labeled xAsic_Reset. Thus, supervisory control circuitry 20, in response to a reset request received at xReset_in from the host controller, is operable to reset first and second power Ethernet managing circuit 30 through the operation of xAsic_Reset. Furthermore, the reset command from supervisory control circuitry 20 is available at external connection xAsic_Reset for connection to other power over Ethernet managing circuits 30 as will be explained further below.

Supervisory control circuitry 20 preferably exhibits a port disable request input connected to an external connection of power over Ethernet module 10, labeled xDisport_in. xDisport_in is preferably connected to a host system controller (not shown) and is utilized by the host system controller to disable the power managed by power over Ethernet managing circuits 30 without issuing a reset. It is to be noted that in the preferred embodiment shown, the host system controller does not directly access first and second power over Ethernet managing circuits 30, but rather addresses a disable request to supervisory control circuitry 20. Supervisory control circuitry 20 preferably exhibits an output connected both to first and second power over Ethernet managing circuits 30 and to an external connection of power over Ethernet module 10, labeled xDisport. Thus, supervisory control circuitry 20, in response to a disable request received at xDisport_in from the host controller, is operable to disable first and second power Ethernet managing circuit 30 through the operation of xDisport. Furthermore, the disable command from supervisory control circuitry 20 is available at external connection xDisport for connection to other power over Ethernet managing circuits 30 as will be explained further below.

Supervisory control circuitry 20 preferably exhibits a host communication bus connected to an external connection of power over Ethernet module 10, labeled I2C. I2C is preferably connected to a host system controller (not shown) and is utilized by the host system controller to communicate bi-directionally with supervisory control circuitry 20. It is to be noted that in the preferred embodiment shown, the host system controller does not directly communicate with first and second power over Ethernet managing circuits 30, but rather communication is directed to and from supervisory control circuitry 20. In an exemplary embodiment the host communication bus is an $I^2C$ bus available from Phillips Semiconductors, Eindhoven, The Netherlands.

Supervisory control circuitry 20 preferably exhibits a host communication UART channel connected to an external connection of power over Ethernet module 10, labeled UART. UART is preferably connected to a host system controller (not shown) and is utilized by the host system controller to communicate bi-directionally with supervisory control circuitry 20. It is to be noted that in the preferred embodiment shown, the host system controller does not directly communicate with first and second power over Ethernet managing circuits 30, but rather communication is directed to and from supervisory control circuitry 20. It is to be understood that the UART channel provided may be utilized in place of the I2C host communication bus, or in addition to the I2C host communication bus. Both the UART channel and the I2C host communication bus, both individually and together, are hereinafter referred to as the host communication bus.

Supervisory control circuitry 20 preferably exhibits an inter-managing circuit communication path, connected both to first and second power over Ethernet managing circuits 30 and to an external connection of power over Ethernet module 10, labeled SPI. The inter-managing circuit communication path is utilized by supervisory control circuitry 20 to command first and second power over Ethernet managing circuits 30, and is available at external connection SPI for communication with other power over Ethernet managing circuits 30 as will be explained further below. In an exemplary embodiment, the inter-managing circuit communication path comprises a serial peripheral interface available from Motorola Inc., Schaumburg, Ill. Thus, supervisory control circuitry 20 is in communication with the host controller over host communication bus I2C and/or the UART channel, and is in communication with power over Ethernet managing circuits 30 over the inter-managing circuit communication path available at external connection SPI.

Figure 1B:
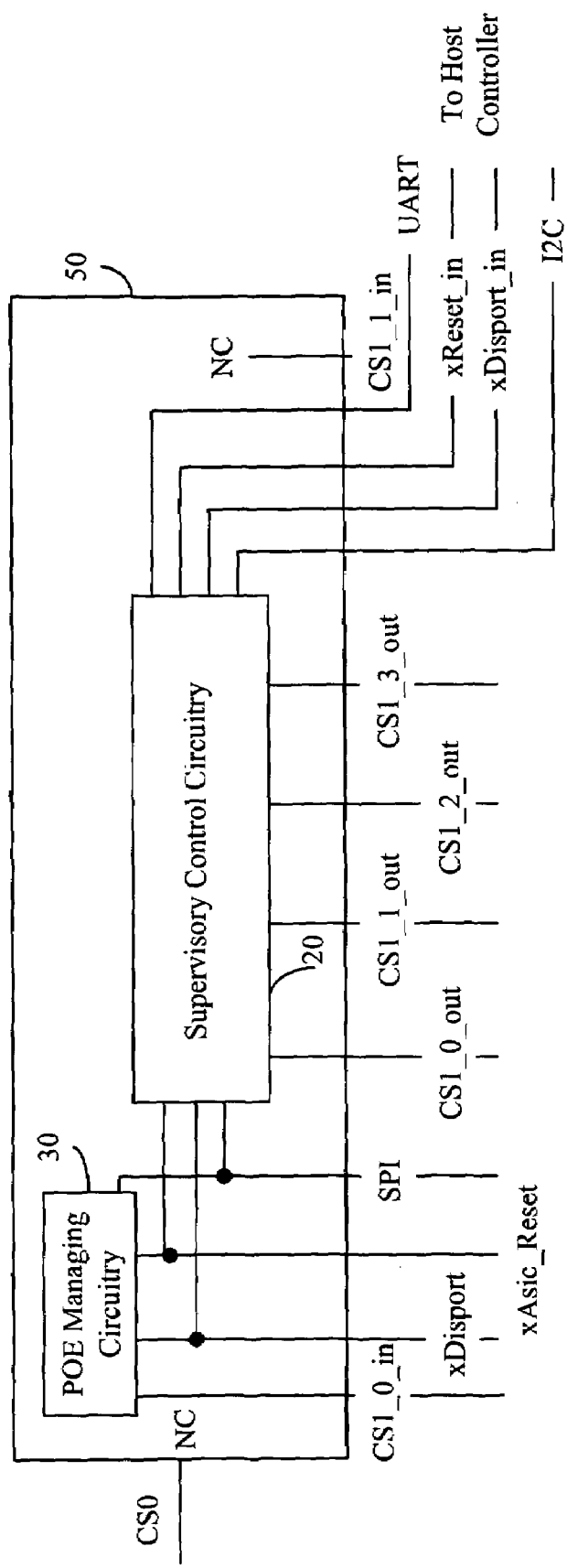
FIG. 1b is a high level schematic diagram of an enhanced power over Ethernet module serving 12 ports comprising supervisory control circuitry.

FIG. 1*b* is a high level schematic diagram of an enhanced power over Ethernet module 50 serving 12 ports comprising supervisory control circuitry 20 and a single second power over Ethernet managing circuit 30. In the exemplary embodiment enhanced power over Ethernet module 50 serves 12 ports, however this is not meant to be limiting in any way. Any number of ports may be served without exceeding the scope of the invention. Power over Ethernet managing circuit 30 is illustrated as an application specific integrated circuit (ASIC), however this is not meant to be limiting in any way. Discrete circuitry, or a generic integrated circuit may be utilized without exceeding the scope of the invention.

The external connections are identical as those described above in relation to enhanced power over Ethernet module 10 of FIG. 1*a*, however it is to be understood that CS1_1_in is not connected to any internal circuitry. In operation, enhanced power over Ethernet module 50 operates in all manners as described above in relation to enhanced power over Ethernet module 10 of FIG. 1*a*, with the exception of the number of output ports supported.

Figure 2A:
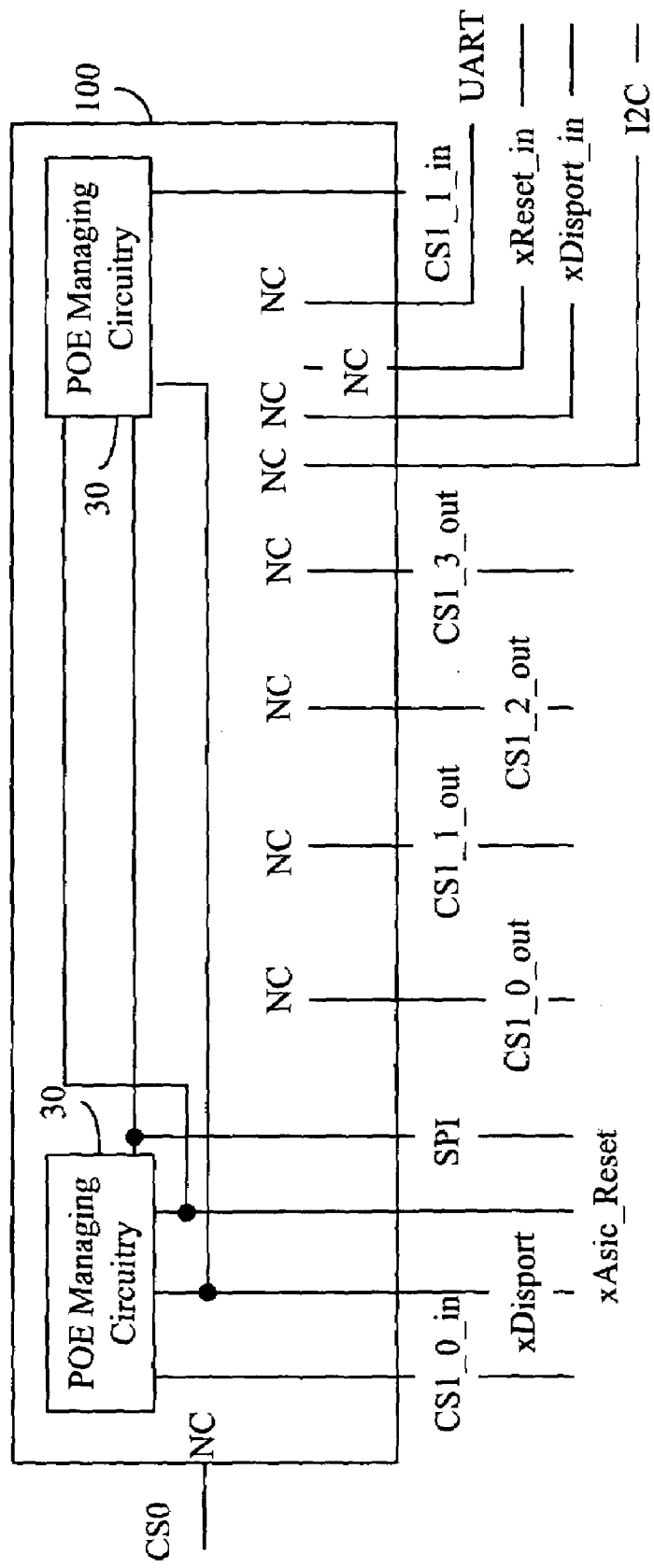
FIG. 2a is a high level schematic diagram of a power over Ethernet module serving 24 ports operative in combination with the enhanced power over Ethernet module of FIGS. 1a or 1b.

FIG. 2*a* is a high level schematic diagram of a power over Ethernet module 100 serving 24 ports operative in combination with one of enhanced power over Ethernet modules 10, 50, of FIGS. 1*a* or 1*b*, respectively. Power over Ethernet module 100 comprises first and second power over Ethernet managing circuits 30. In the exemplary embodiment two power over Ethernet managing circuits 30 are illustrated, however this is not meant to be limiting in any way. Any number of power over Ethernet managing circuits 30 may be implemented without exceeding the scope of the invention. Similarly, in an exemplary embodiment, power over Ethernet module 100 serves 24 ports, however this is not meant to be limiting in any way. Any number of ports may be served without exceeding the scope of the invention. Power over Ethernet managing circuits 30 are illustrated as an application specific integrated circuit (ASIC), however this is not meant to be limiting in any way. Discrete circuitry, or a generic integrated circuit may be utilized without exceeding the scope of the invention.

First power over Ethernet managing circuit 30 has a select input connected to an external connection of power over Ethernet module 100, labeled CS1_0_in. Second power over Ethernet managing circuit 30 has a select input connected to an external connection of power over Ethernet module 100, labeled CS1_1_in. An external connection labeled CS0 is supplied; however external connection CS0 is not operatively connected to either first or second power over Ethernet managing circuit 30.

First and second power over Ethernet managing circuit 30 exhibit a reset input connected to an external connection labeled xAsic_Reset, and a port disable input connected to an external connection labeled xDisport. First and second power over Ethernet managing circuits 30 further exhibit an inter-managing circuit communication path connected to an external connection, labeled SPI. No operative internal connection is made to external connections I2C; xDisport_in; xReset_in and UART; and no internal connection is made to any of external connections CS1_0_out; CS1_1_out; CS1_2_out; and CS1_3_out.

In operation, first and second power over Ethernet managing circuits 30 operate in response to commands received over the inter-managing circuit communication path through external connection SPI from supervisory control circuitry 20 located on one of enhanced power over Ethernet controller 10 or 50. Selection of first or second power over Ethernet managing circuit for communication is accomplished through activation of the respective external connection CS1_0_in and CS1_1_in, as will be explained further hereinto below. A reset request is received from supervisory control circuitry 20 at external connection xAsic_Reset, and the reset request is connected to both first and second power over Ethernet managing circuit 30. A port disable request is received from supervisory control circuitry 20 at external connection xDisport, and the port disable request is connected to both first and second power over Ethernet managing circuit 30.

Figure 2B:
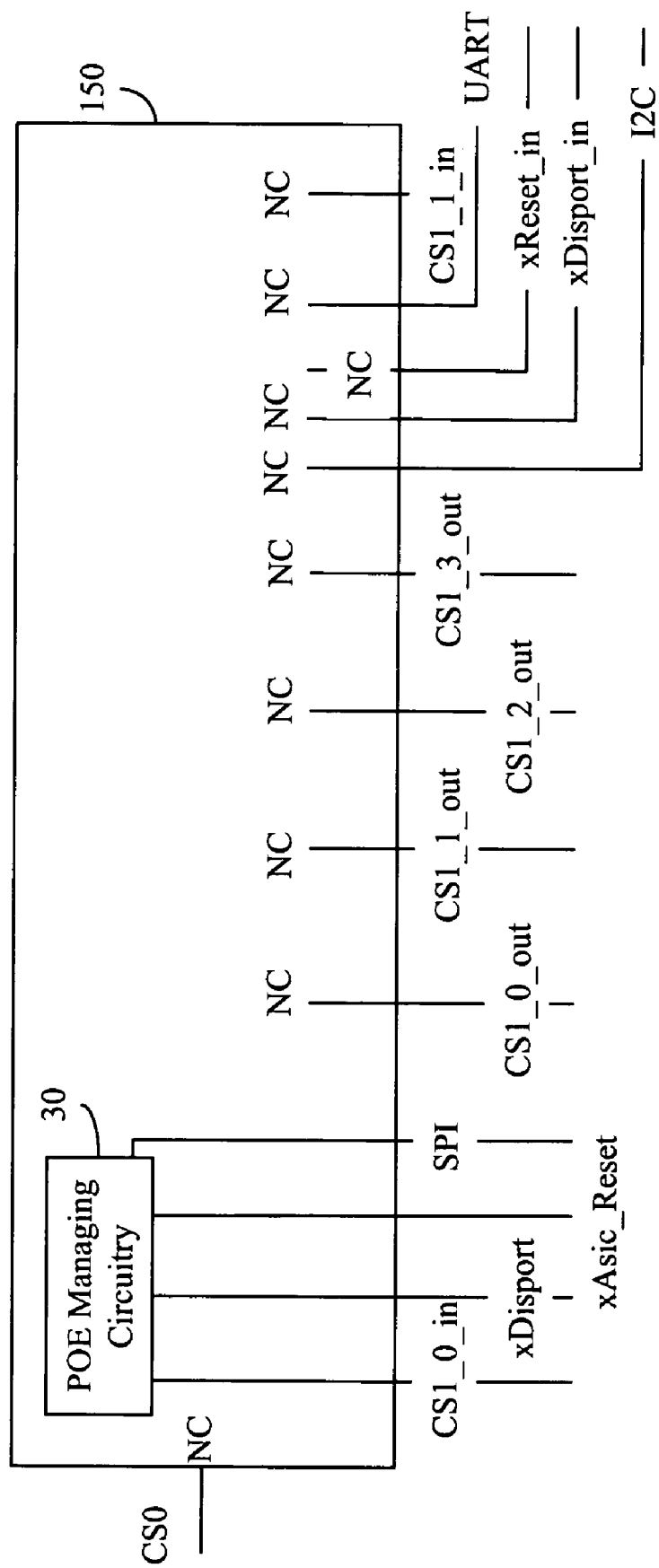
FIG. 2b is a high level schematic diagram of a power over Ethernet module serving 12 ports operative in combination with the enhanced power over Ethernet module of FIGS. 1a or 1b.

FIG. 2*b* is a high level schematic diagram of a power over Ethernet module 150 serving 12 ports operative in combination with the enhanced power over Ethernet modules 10 or 50, respectively, of FIGS. 1*a* or 1*b* comprising power over Ethernet managing circuit 30. In the exemplary embodiment power over Ethernet module 150 serves 12 ports, however this is not meant to be limiting in any way. Any number of ports may be served without exceeding the scope of the invention. Power over Ethernet managing circuit 30 is illustrated as an application specific integrated circuit (ASIC), however this is not meant to be limiting in any way. Discrete circuitry, or a generic integrated circuit may be utilized without exceeding the scope of the invention.

The external connections are identical as those described above in relation to power over Ethernet module 100 of FIG. 2*a*, however it is to be understood that external connection CS1_1_in is preferably not operatively connected to any internal circuitry. In operation, power over Ethernet module 150 operates in all manners as described above in relation to power over Ethernet module 100 of FIG. 2*a*, with the exception of the number of output ports supported.

Figure 3A:
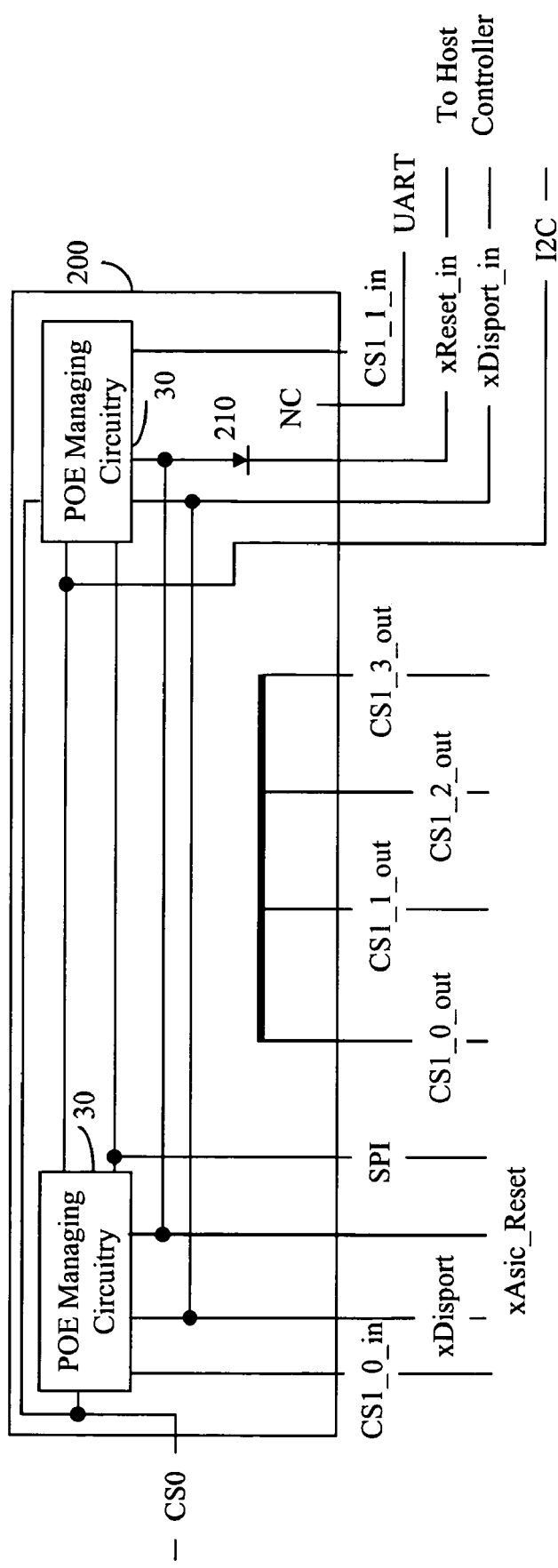
FIG. 3a is a high level schematic diagram of a power over Ethernet module serving 24 ports operative without supervisory control circuitry.

FIG. 3*a* is a high level schematic diagram of a power over Ethernet module 200 serving 24 ports without supervisory control circuitry. Power over Ethernet module 200 comprises first and second power over Ethernet managing circuits 30 and diode 210. In the exemplary embodiment two power over Ethernet managing circuits 30 are illustrated, however this is not meant to be limiting in any way. Any number of power over Ethernet managing circuits 30 may be implemented without exceeding the scope of the invention.

Similarly, in an exemplary embodiment, power over Ethernet module 200 serves 24 ports, however this is not meant to be limiting in any way. Any number of ports may be served without exceeding the scope of the invention. Power over Ethernet managing circuits 30 are illustrated as an application specific integrated circuit (ASIC), however this is not meant to be limiting in any way. Discrete circuitry, or a generic integrated circuit may be utilized without exceeding the scope of the invention.

First power over Ethernet managing circuit 30 has a first select input connected to an external connection of power over Ethernet module 200, labeled CS1_0_in, and a second select input connected to an external connection of power over Ethernet module 200, labeled CS0. Second power over Ethernet managing circuit 30 has a first select input connected to an external connection of power over Ethernet module 200, labeled CS1_1_in, and a second select input connected to external connection CS0 of power over Ethernet module 200. External connections CS1_0_out; CS1_1_out; CS1_2_out; and CS1_3_out are connected together, also known as shorted together, internally on power over Ethernet module 200, thus effectively shorting together CS1_0_in and CS1_1_in of all connected power over Ethernet modules 10 as will be explained further hereinto below. Power over Ethernet module 200 is preferably not utilized in combination with enhanced power over Ethernet modules 10 or 50. Furthermore, power over Ethernet module 200 is preferably not utilized in combination with power over Ethernet modules 100 or 150 designed for use with enhanced power over Ethernet modules 10 or 50.

First and second power over Ethernet managing circuit 30 exhibit a reset input connected to an external connection labeled xAsic_Reset. External connection xAsic_Reset is connected through diode 210 to xReset_in internally on power over Ethernet module 200, thus allowing for a connected host controller to reset all power over Ethernet managing circuits 30 through the operation of xReset_in. Furthermore, any of the connected power over Ethernet managing circuits 30 can act to reset all the power over Ethernet managing circuits 30 without signaling the host controller.

First and second power over Ethernet managing circuit 30 exhibit a port disable input connected to an external connection labeled xDisport_in. External connections xDisport_in and xDisport are connected together on power over Ethernet module 200, thus allowing for a connected host controller to disable all power over Ethernet managing circuits 30 through the operation of xDisport_in.

First and second power over Ethernet managing circuits 30 further exhibit a connection to an inter-managing circuit communication path connected to external connection SPI, thus allowing for communication among all connected power over Ethernet managing circuits 30. First and second power over Ethernet managing circuits 30 further exhibit an external connection, labeled I2C, to the host communication bus, thus allowing for control by the host controller of each of the connected power over Ethernet managing circuits 30. No operative internal connection is made to external connection UART.

In operation, first and second power over Ethernet managing circuit 30 operate in response to commands received over the host communication bus connected to external connection I2C, and communicate among themselves over the inter-managing circuit communication path connected to external connection SPI. Preferably, one of first and second power over Ethernet managing circuits 30 is selected as a master, and the selected master Power over Ethernet managing circuit 30 addresses all other connected power over Ethernet managing circuits, which preferably act as slaves, through the use of the combination of external connections CS0 and either CS1_0_in or CS1_1_in. As will be described further below, in operation CS1_0_in and CS1_1_in are connected together, and thus act as a single address selector.

Figure 3B:
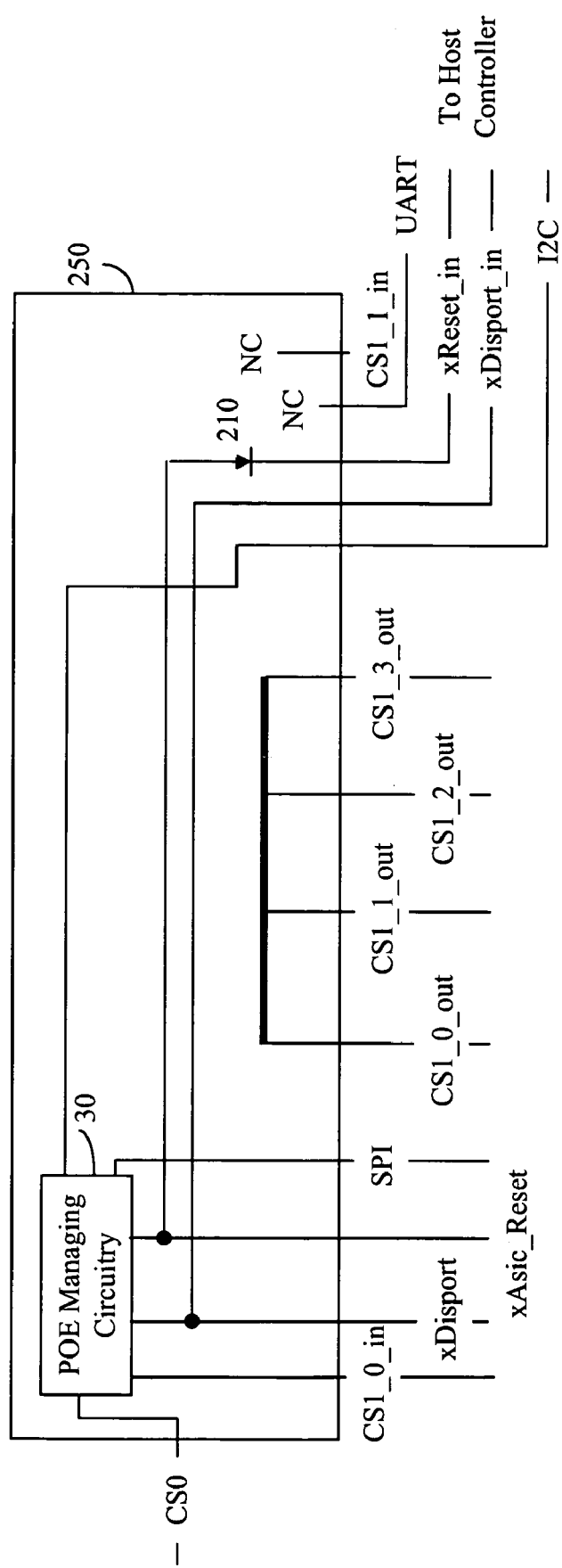
FIG. 3b is a high level schematic diagram of a power over Ethernet module serving 12 ports operative without supervisory control circuitry.

FIG. 3b is a high level schematic diagram of a power over Ethernet module 250 serving 12 ports without a supervisory control circuit. In an exemplary embodiment power over Ethernet module 250 serves 12 ports, however this is not meant to be limiting in any way. Any number of ports may be served without exceeding the scope of the invention. Power over Ethernet managing circuit 30 is illustrated as an application specific integrated circuit (ASIC), however this is not meant to be limiting in any way. Discrete circuitry, or a generic integrated circuit may be utilized without exceeding the scope of the invention.

The external connections are identical as those described above in relation to power over Ethernet module 200 of FIG. 3a. In operation, power over Ethernet module 250 operates in all manners as described above in relation to power over Ethernet module 200 of FIG. 3a, with the exception of the number of output ports supported.

Figure 4:
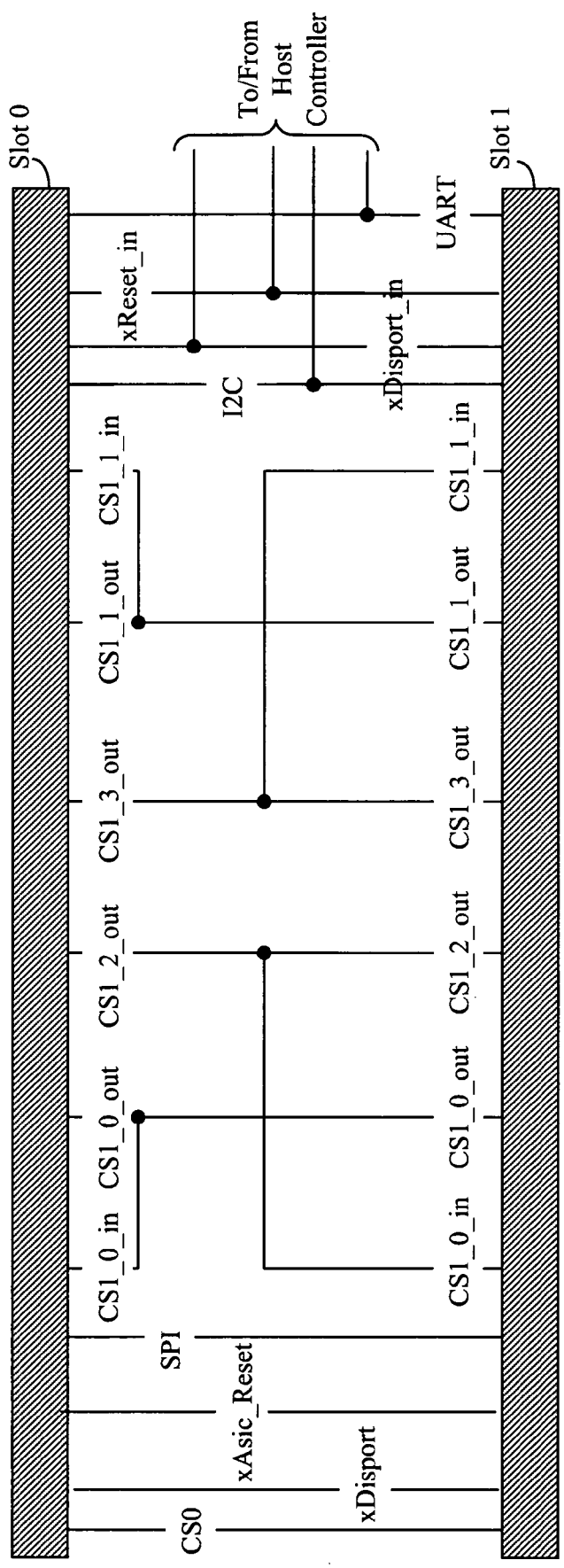
FIG. 4 is a high level schematic diagram of a printed circuit board layout designed for use with the power over Ethernet modules of FIGS. 1a–3b.

FIG. 4 is a high level schematic diagram of a printed circuit board layout designed for use with the power over Ethernet modules of FIGS. 1a–3b, comprising a slot 0 and a slot 1 for connecting a plurality of power over Ethernet modules. An advantageous feature of the layout illustrated is that modules can be placed in either slot 0 or slot 1 without affecting the operation of the modules. In a preferred embodiment slot 0 is operative to control power to ports 0–23 and slot 1 is operative to control power to ports 24–47.

External connection CS1_0_out of slot 0 is connected to external connection CS1_0_out of slot 1. External connection CS1_1_out of slot 0 is connected to external connection CS1_1_out of slot 1. External connection CS1_2_out of slot 0 is connected to external connection CS1_2_out of slot 1. External connection CS1_3_out of slot 0 is connected to external connection CS1_3_out of slot 1.

External connection CS1_0_out of both slot 0 and slot 1 is connected to CS1_0_in of slot 0; and external connection CS1_1_out of both slot 0 and slot 1 is connected to external connection CS1_1_in of slot 0. External connection CS1_2_out of both slot 0 and slot 1 is connected to external connection CS1_0_in of slot 1; and external connection CS1_3_out of both slot 0 and slot 1 is connected to external connection CS1_1_in of slot 1.

External connection CS0 of slot 0 is connected to external connection CS0 of slot 1. External connection xDisport of slot 0 is connected to external connection xDisport of slot 1. External connection xAsic_Reset of slot 0 is connected to external connection xAsic_Reset of slot 1. Inter-managing circuit communication path external connection SPI of slot 0 is connected to inter-managing circuit communication path external connection SPI of slot 1.

Host communication bus external connection I2C of slot 0 is connected to host communication bus external connection I2C of slot 1, and to the appropriate connections of the host controller (not shown). External connection xDisport_in of slot 0 is connected to external connection xDisport_in of slot 1, and is further connected to a disable port request output of the host controller (not shown). External connection xReset_in of slot 0 is connected to external connection xReset_in of slot 1, and is further connected to a reset request output of the host controller (not shown). Host communication UART channel external connection UART of slot 0 is connected to host communication UART channel external connection UART, and to appropriate connections of the host controller (not shown).

In operation, the layout of FIG. 4 enables the placement of an enhanced power over Ethernet module 10 or 50 in either of slot 0 or slot 1; and the placement of a power over Ethernet module 100 or 150 designed to be operative with an enhanced power over Ethernet module 10, 50 in the unoccupied slot (slot 1 or slot 0, respectively). Supervisory control circuitry 20 is operative from either slot 0 or slot 1 to control all power over Ethernet managing circuits 30, irrespective of placement. In particular, supervisory control circuitry 20, irrespective of its location in regards to slot 0 and slot 1, operates external connection CS1_0_out to indicate a managing circuit select to the power over Ethernet managing circuit 30 connected to external connection CS1_0_in of slot 0. Similarly, supervisory control circuitry 20 operates external connection CS1_1_out to indicate a managing circuit select to the power over Ethernet managing circuit 30 connected to external connection CS1_1_in of slot 0. Supervisory control circuitry 20 further operates external connection CS1_2_out to indicate a managing circuit select to the power over Ethernet managing circuit 30 connected to external connection CS1_0_in of slot 1 and operates external connection CS1_2_out to indicate a managing circuit select to the power over Ethernet managing circuit 30 connected to external connection CS1_1_in of slot 1.

Supervisory control circuitry 20 is operative to receive reset requests at xReset_in from the host computer, and to reset all power over Ethernet managing circuits 30 by the operation of external connection xAsic_reset irrespective of the location of supervisory control circuitry 20. Supervisory control circuitry 20 is operative to receive port disable requests at xDisport_in from the host computer, and to disable all power over Ethernet managing circuits 30 by the operation of external connection xDisport irrespective of the location of supervisory control circuitry 20. Supervisory control circuitry 20 is responsive to messages received over the host communication bus at external connection I2C and/or received over the UART channel at external connection UART; is in communication with the host over the host communication bus through external connection I2C and/or over the UART channel through external connection UART; and is in communication with the power over Ethernet managing circuits 30 over the inter-managing circuit communication path through external connection SPI, irrespective of location. It is to be understood that the use of supervisory control circuitry 20 communicating over the inter-managing circuit communication path available at external connection SPI enables additional functionality and coordination not available over the host communication bus available at external connection I2C. In the exemplary embodiment shown, the UART channel available at external connection UART is only utilized for communication between the host and supervisory control circuitry 20.

The layout of FIG. 4 further enables the placement of power over Ethernet modules 200 or 250 in slot 0 and/or slot 1 without any changes in layout. For communication purposes, and for ease of coordination, preferably one power over Ethernet managing circuit 30 acts as the master, and all other power over Ethernet managing circuits 30 act as slaves. The power over Ethernet managing circuit 30 acting as the master operates the combination of external connection CS0 and CS1_0_in (or CS1_1_in) to address a specific power over Ethernet managing circuit. It is to be noted that the layout of FIG. 4 enables CS0 to be connected to all power over Ethernet managing circuits 30 of modules 200 and 250. Furthermore CS1_0_in is connected to CS1_1_in and is therefore available at all power over Ethernet managing circuits 30 of modules 200 and 250. It is to be understood that a maximum of four power over Ethernet managing circuits 30 are shown, this being addressable by a combination of 2 data bits represented by the combination of CS0 and CS1_0_in, however this is not meant to be limiting in any way. Additional bits may be added thus addressing a greater number of power over Ethernet managing circuits 30 without exceeding the scope of the invention.

Power over Ethernet managing circuits 30 are responsive to reset requests received at external connection xReset_in from the host computer irrespective of location. Furthermore, any connected power over Ethernet managing circuit 30 can reset all the connected power over Ethernet managing circuits through the operation of xAsic_Reset. Power over Ethernet managing circuits 30 are in communication with the host controller over the host communication bus available at external connection I2C, and the power over Ethernet managing circuits 30 communicate among themselves over the inter-managing circuit communication path available at external connection SPI irrespective of location. Power over Ethernet managing circuits 30 are responsive to disable requests received at external connection xDisport_in from the host computer irrespective of location.

Thus, the present embodiments enable an interchangeable power over Ethernet module having a plurality of configurations and single unified pin out. In an exemplary embodiment the plurality of configurations include: an enhanced master module having dedicated on-board supervisory control circuitry; a slave module designed to work with an enhanced master module; and a reduced functionality module having no dedicated on-board supervisory control circuitry.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. An interchangeable power over Ethernet module having a plurality of configurations, and a single unified pin out, the power over Ethernet module comprising:

at least one circuitry managing the supply of power over Ethernet to at least one port;

a first set of external connections associated with a first one of the plurality of configurations, said first one of the plurality of configuration comprising supervisory control circuitry, each connection of said first set of external connections being individually operably connected to said supervisory control circuitry;

said first set of external connections being commonly connected together in a second one of the plurality of configurations.

2. An interchangeable power over Ethernet module according to claim 1, further comprising a second set of external connections, each external connection of said second set of external connections being associated with a unique one of said at least one circuitry managing the supply of power over Ethernet to at least one port.

3. An interchangeable power over Ethernet module according to claim 2, further comprising at least one external connection being designated for connection to all of said at least one circuitry managing the supply of power over Ethernet in said second one of the plurality of configurations.

4. An interchangeable power over Ethernet module according to claim 3, said at least one external connection not being operatively connected to said at least one circuitry managing the supply of power over Ethernet in said first one of the plurality of configurations.

5. An interchangeable power over Ethernet module according to claim 1, further comprising a third configuration, said third configuration being a power over Ethernet module operable with a power over Ethernet module of said first configuration under control of said supervisory control circuitry.

6. An interchangeable power over Ethernet module according to claim 1, further comprising a host communication bus for communicating with a host controller.

7. An interchangeable power over Ethernet module according to claim 6, wherein said host communication bus comprises a UART channel.

8. An interchangeable power over Ethernet module according to claim 6, wherein said host communication bus comprises an I²C bus.

9. An interchangeable power over Ethernet module according to claim 6, further comprising an inter-managing circuit communication path being operable by said supervisory control circuitry to communicate with said at least one circuit managing the supply of power over Ethernet.

10. An interchangeable power over Ethernet module according to claim 9, wherein said control circuitry communicates with said host controller over said host communication bus and said supervisory control circuitry further communicates with said at least one circuitry managing the supply of power over Ethernet over said inter-managing circuit communication path.

11. An interchangeable power over Ethernet module according to claim 1, further comprising an inter-managing circuit communication path, said inter-managing circuit communication path being operable by said supervisory control circuitry to communicate with said at least one circuit managing the supply of power over Ethernet.

12. An interchangeable power over Ethernet module according to claim 1, wherein said second configuration is a power over Ethernet module without supervisory control circuitry.

13. An interchangeable power over Ethernet module according to claim 12, further comprising an inter-managing circuit communication path connected to all of said at least one circuitry managing the supply of power over Ethernet.

14. An interchangeable power over Ethernet module according to claim 12, further comprising a host communication bus operable for communication with a host controller.

15. An interchangeable power over Ethernet module according to claim 14, wherein said host communication bus is connected to all of said at least one circuitry managing the supply of power over Ethernet.

16. An interchangeable power over Ethernet module according to claim 12, wherein one of said at least one circuitry managing the supply of power over Ethernet acts as a master.

17. An interchangeable power over Ethernet module according to claim 16, further comprising at least one external connection being designated for connection to all of said at least one circuitry managing the supply of power over Ethernet in said second one of the plurality of configurations, said one of said at least one circuitry managing the supply of power over Ethernet acting as a master being operable to utilize said at least one external connection to address all other at least one circuitry managing the supply of power over Ethernet.

18. An interchangeable power over Ethernet module according to claim 17, further comprising a second set of external connections, each connection of said second set of external connections being associated with a unique one of said at least one circuitry managing the supply of power over Ethernet, said at least one circuitry acting as a master being operable to utilize said second set of external connections to address all other at least one circuitry managing the supply of power over Ethernet.

19. An interchangeable power over Ethernet module according to claim 1, further comprising a reset request input external connection and a reset output external connection, said reset request input external connection and said reset output external connection being operably interconnected in said second configuration.

20. An interchangeable power aver Ethernet module according to claim 1, further comprising a disable port request input external connection and a disable port output external connection, said disable port request input external connection and said disable port output external connection being operably interconnected in said second configuration.

* * * * *